C. M. TRAMMELL.
DEVICE FOR HOLDING EXTRA WHEELS ON BODIES OF AUTOMOBILES.
APPLICATION FILED OCT. 25, 1919.
1,350,896.
Patented Aug. 24, 1920.
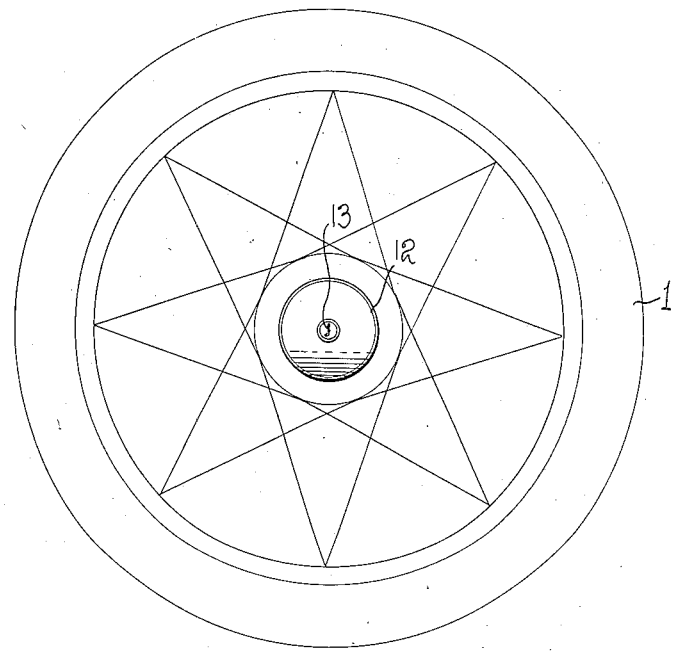
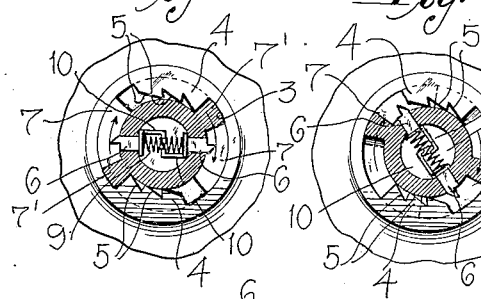
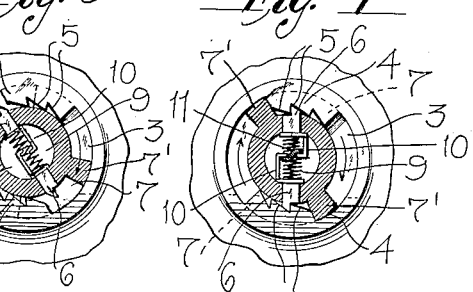
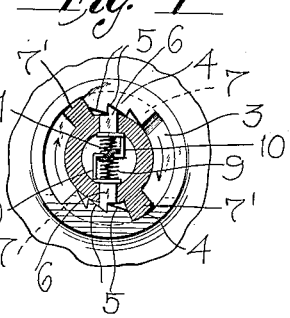
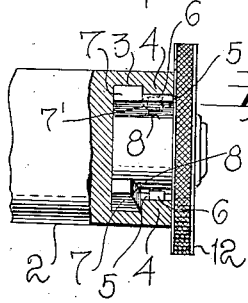
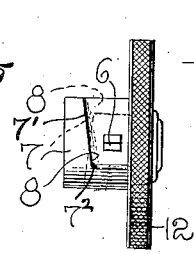
Inventor:
Charles M. Trammel.
By
Attorney.

UNITED STATES PATENT OFFICE.

CHARLES M. TRAMMELL, OF LAKELAND, FLORIDA, ASSIGNOR OF ONE-HALF TO EDWARD A. HENSKE, OF WASHINGTON, DISTRICT OF COLUMBIA.

DEVICE FOR HOLDING EXTRA WHEELS ON BODIES OF AUTOMOBILES.

1,350,896.  Specification of Letters Patent.  Patented Aug. 24, 1920.

Application filed October 25, 1919. Serial No. 333,283.

*To all whom it may concern:*

Be it known that I, CHARLES M. TRAMMELL, a citizen of the United States, residing at Lakeland, in the county of Polk and State of Florida, have invented certain new and useful Improvements in Devices for Holding Extra Wheels on Bodies of Automobiles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in device for locking extra wheels upon the bodies of automobiles and consists of a simple and efficient device of this nature which will be hereinafter fully described, shown in the accompanying drawings and then specifically defined in the appended claims.

My invention is illustrated in the accompanying drawings which, with the numerals of reference marked thereon, form a part of this application, and in which:

Figure 1 is an elevation showing the device as applied to the extra wheel.

Fig. 2 is a view in elevation showing the turning block before being turned into a locked position.

Fig. 3 is a similar view showing the pawls about to be locked.

Fig. 4 is a view showing the parts locked together.

Fig. 5 is a view in elevation, parts being in section, and

Fig. 6 is an enlarged side elevation of the removable locking plug.

Reference now being had to the details of the drawings by numerals:

1 designates a wheel with a tire on it, and 2 is a socket member adapted to be attached to any convenient part of an automobile, and 3 is a recess in the end thereof, said recess having flanges 4 opposite each other extending partially about the recessed portion, the marginal edges of said flanges having ratchet teeth therein.

The removable locking plug, a detail of which is shown in Fig. 6 of the drawings, has a shank portion 7 recessed in the circumference, one edge of the recess being inclined as at $7'$ and terminating at $7^2$ at its inner end. The plug which is hollow is provided with diametrically opposite apertures in which are mounted pawls 6 adapted to engage said ratchet teeth when in the position shown in Fig. 4 of the drawings.

Each pawl has an integral finger 10 terminating in an angled end, and 9 is a coiled spring interposed between the two pawls, and tends to hold the latter at their farthest outer limits.

A key 11 is adapted to be fitted in a key hole in the disk 12 having a milled circumference, and engages the inner angled ends of the projections and pawls, as shown clearly in Fig. 4, and affording means whereby as the key is turned, the pawls may be retracted and drawn out of engagement with the ratchet teeth, and which will permit the plug to be rotated in a reverse direction to clear the flanges 4 from the recesses 8, which latter, when the device is in a locked position, are behind and have wedging action against the inner faces of said flanges.

When the plug is turned to a locked position, the ends of said flanges 4 will come in contact with the end $7^2$ of the recess and limit the movement of the plug in one direction.

By the provision of a locking device embodying the features of my invention, it will be noted that a simple and efficient means is provided, whereby the wheel with extra tire may be securely locked in place upon an automobile and readily accessible through the medium of a key to release the parts.

What I claim to be new is:

1. A device for locking extra wheels upon bodies of automobiles consisting of a socket member, with flanges formed within the socket with ratchet teeth in the edges of said flanges, a plug adapted to engage said socket and having lugs coöperating with the flanges to retain the plug, and means for preventing the plug from turning when in a locked position.

2. A device for locking extra wheels upon bodies of automobiles consisting of a socket member, with flanges formed within the socket with ratchet teeth intermediate said flanges, a plug adapted to engage said socket and having lugs coöperating with the flanges to retain the plug, pawls carried by the plug adapted to engage a socket member to hold the plug from turning when in a locked position.

3. A device for locking extra wheels upon bodies of automobiles consisting of a socket member, having flanges projecting from the wall of the socket portion, with teeth in the circumferential wall of the recessed portion of the socket intermediate the flange, a plug adapted to engage said socket and having wedge-shaped portions for engagement with said flanges, and pawls carried by the plug adapted to engage said teeth, and key-operated mechanism for holding the pawls in engagement with said teeth.

4. A device for locking extra wheels upon bodies of automobiles consisting of a socket member, having flanges projecting from the wall of the socket portion, with teeth in the circumferential wall of the recessed portion of the socket intermediate the flange, a plug adapted to engage said socket and having wedge-shaped portions for engagement with said flanges, pawls mounted in said plug, springs for holding the same out of engagement with said ratchet teeth, and key-operated means for throwing the pawls into engagement with said teeth.

5. A device for locking extra wheels upon bodies of automobiles consisting of a socket member having flanges projecting from the wall of the socket portion, with teeth in the circumferential wall of the recessed portion of the socket intermediate the flange, a plug adapted to engage said socket and having wedge-shaped portions for engagement with said flanges, a rotatable key-operated element with cam members projecting therefrom adapted, as the key element is rotated by a key, to contact with said pawls to throw the same into engagement with said teeth.

In testimony whereof I hereunto affix my signature.

CHARLES M. TRAMMELL.